DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 5, 1973

911 O.G. 8

T911,006

POLYETHYLENE GRAFT POLYMERS

Max F. Meyer, Jr., Robert L. Combs, and Willis C. Wooten, Jr., all of P.O. Box 511, Kingsport, Tenn. 37662

Continuation-in-part of application Ser. No. 779,637, Nov. 27, 1968, and a continuation of application Ser. No. 125,892, Mar. 18, 1971. This application May 30, 1972, Ser. No. 257,993

Int. Cl. C08f *15/00*

U.S. Cl. 260—878 R

No Drawing. 23 Pages Specification

Graft polymers prepared by reacting polyethylene having unsaturation of at least 0.10 percent with vinyl and acrylic monomers containing as a catalyst an organic peroxide selected from the group consisting of benzoyl peroxide and tertiary butyl perbenzoate.